United States Patent [19]

Sundback et al.

[11] Patent Number: 5,047,182

[45] Date of Patent: Sep. 10, 1991

[54] COMPLEX CERAMIC AND METALLIC SHAPED BY LOW PRESSURE FORMING AND SUBLIMATIVE DRYING

[75] Inventors: Cathryn A. Sundback, Harvard; Bruce E. Novich, Lexington, both of Mass.; Angelica E. Karas, New Brunswick, N.J.; Richard W. Adams, Marlborough, Mass.

[73] Assignee: Ceramics Process Systems Corporation, Milford, Mass.

[21] Appl. No.: 668,679

[22] Filed: Mar. 7, 1991

Related U.S. Application Data

[63] Continuation of Ser. No. 412,108, Sep. 25, 1989, abandoned, which is a continuation-in-part of Ser. No. 180,092, Apr. 11, 1988, abandoned, which is a continuation-in-part of Ser. No. 36,085, Apr. 9, 1987, abandoned, and a continuation-in-part of Ser. No. 125,643, Nov. 25, 1987, abandoned.

[51] Int. Cl.$^5$ .............................................. C04B 41/92
[52] U.S. Cl. .......................................... 264/28; 264/56; 264/63; 264/328.2; 419/34; 419/36; 419/37; 419/39; 419/66
[58] Field of Search ................ 264/28, 56, 328.2, 63; 419/66, 34, 36, 37, 39

[56] References Cited

U.S. PATENT DOCUMENTS

| | | | |
|---|---|---|---|
| 2,765,512 | 10/1956 | Nesbit | 264/28 |
| 2,869,215 | 1/1959 | Smith | 264/28 |
| 2,893,102 | 7/1959 | Maxwell et al. | 264/28 |
| 2,944,316 | 7/1960 | Maxwell et al. | 264/28 |
| 3,234,308 | 2/1966 | Herrmann | 264/63 |
| 3,330,892 | 7/1967 | Hermann | 264/63 |
| 3,512,571 | 5/1970 | Phelps | 264/63 |
| 3,567,520 | 3/1971 | Dennery et al. | 136/120 |
| 3,885,005 | 5/1975 | Downing et al. | 264/28 |
| 4,011,291 | 3/1977 | Curry | 264/43 |
| 4,113,480 | 9/1978 | Rivers | 264/63 |
| 4,341,725 | 7/1982 | Weaver et al. | 264/28 |
| 4,552,800 | 11/1985 | Blasch et al. | 428/212 |
| 4,677,082 | 6/1987 | Alford et al. | 501/1 |
| 4,734,237 | 3/1988 | Fanelli et al. | 264/63 |
| 4,816,182 | 3/1989 | Novich et al. | 264/56 |
| 4,882,088 | 11/1989 | Novich et al. | 106/482 |
| 4,882,304 | 11/1989 | Novich et al. | 264/63 |
| 4,904,411 | 2/1990 | Novich et al. | 264/212 |

FOREIGN PATENT DOCUMENTS

| | | |
|---|---|---|
| 0160855 | 11/1985 | European Pat. Off. . |
| 0161494 | 11/1985 | European Pat. Off. . |
| 3011911 | 9/1981 | Fed. Rep. of Germany . |
| 59-076641 | 5/1984 | Japan . |
| 263703 | 11/1986 | Japan . |
| 2163780 | 3/1986 | United Kingdom . |

OTHER PUBLICATIONS

Kwiatkowski et al., "Preparation of Corundum and Steatite Ceramics by the Freeze Drying Method," *Ceramurgia Int'l.*, 6(2), 79-82, 1980.

Chemical Abstracts 98:165877c, 1982.

Tomilov et al., "Molding Quartz-Ceramic Articles Using an Aqueous-Slip Freezing Method," *Glass & Ceramics*, No. 10, 655-656, Sep.-Oct., 1977.

*Primary Examiner*—James Derrington

[57] ABSTRACT

A process for forming articles from inorganic sinterable particulates includes providing a well-dispersed, low pressure injectable slurry, freeze-forming the slurry into a desired geometry, and drying the piece so formed by a predominantly sublimative process, to produce a green article that can be conventionally sintered. The vehicle has a volume change on freezing of not more than ±10% by volume; to further control the volume change on freezing, an emulsion derived from different vehicles can be tailored. The slurries preferably have a solids content of at least about 35 v/o, a viscosity of preferably not more than about 1000 cP at 100 s$^{-1}$, and are preferably injectable at not more than about 1000 psi, usually at less than 100 psi.

16 Claims, No Drawings

COMPLEX CERAMIC AND METALLIC SHAPED BY LOW PRESSURE FORMING AND SUBLIMATIVE DRYING

BACKGROUND OF THE INVENTION

This application is a continuation of Ser. No. 07/412,108 filed Sept. 25, 1989, which is a continuation-in-part of co-pending U.S. patent application Ser. No. 180,092, filed 11 Apr., 1988, now abandoned, which is a continuation-in-part of application Ser. No. 036,085, filed Apr. 9, 1987, now abandoned and is also a continuation-in-part of co-pending U.S. patent application Ser. No. 125,643, filed Nov. 25, 1987, now abandoned.

2. Field of the invention

The present invention pertains to forming complexly shaped articles by freeze-forming a non-aqueous slurry of inorganic solids, generally ceramic and/or metallic, by molding the slurry into a desired shape and then drying the frozen shape by non-destructive evaporation/sublimation to provide a green article with adequate green strength. The forming operation can be performed under low pressure and the green article can be conventionally sintered.

2. The state of the art

Complexly shaped, three-dimensional, high performance ceramic parts are essential structural and electronic components for a wide variety of industrial applications. High performance properties are, for example, strength, toughness, uniformity, surface finish, resistivity, optical properties, and thermal expansion. These and other properties are markedly affected by the quality of the starting material and the manner in which it is processed. Factors that have limited the production of advanced ceramics for high performance applications are (i) poor strength and reliability, stemming from poor raw material quality and improper processing techniques, and (ii) high cost, stemming from low product yields, long processing cycle times, and high capital equipment expenditures.

For example, a high strength, high performance alumina article is one which can be characterized by a fully densified body homogeneously composed of uniform submicron alumina grains. If a processing step introduces a texture or a defect of a critical size into the microstructure, typically about 20–50 $\mu$m, a strength limiting flaw will have been created and will result in a severe departure from the intrinsic or high performance properties desired. Historically, ceramics have not been used for high performance applications due to poor or inhomogeneous starting materials and the inclusion of property limiting defects through inadequate processing, both as mentioned above. Only recently has the ceramics community recognized the importance of both the starting materials and the processing techniques on the properties of the article produced.

Typically, three-dimensional complexly shaped ceramic parts are manufactured by a process analogous to thermoplastic injection molding, in which a ceramic or metallic powder is compounded with a mixture of molten or solvated thermoplastic resins at high torque. The resulting mixture has a dough-like consistency, which is why the compounding process is generally referred to as "kneading." Homogeneous particle dispersion is difficult and tedious to obtain in such a system, and traditionally has been a source of microstructural defects, such as holes and non-uniform particle packing.

The resulting mixture is then molded using a high pressure injection molding machine. The molding machine and the molds used are typically large and expensive because injection pressures typically have an approximate range of 2500 psi to 30,000 psi, thus requiring mold clamping forces in the "tens of tons" range. The high viscosity and dough-like consistency of the molding composition can result in weld or knit lines and mold gate, sprue, and parting line textures, all of which can create property limiting defects.

After the part is molded, the thermoplastic/ceramic composition is subjected to binder removal, which is a long (typically requiring days), expensive, and deleterious process, particularly for a fine particle matrix typical of a high performance ceramic body. Initially, binder removal can result in bubble formation, delamination, and blistering of the part (as typically 40% by volume of the composite is a plastic material which is removed from a finely porous body). Binder removal is commonly practiced by heating the polymer/ceramic composite beyond the polymer softening point; accordingly, dimensional tolerance is difficult to control because of fluids escaping from the softening composite matrix; this liquefaction often coincides with the development of internal pressures due to gasification of the polymer (by depolymerization, vaporization, or pyrolysis reactions).

After binder removal, and for all processes in which a densified article is desired, the porous particulate body is sintered at high temperatures so that the particulates can fuse together; this reaction produces a dense, strong ceramic that is approximately 20% smaller than the presintered (green) particulate part. Final machining is generally required due to poor dimensional tolerances, parting lines, and gate remanents remaining on the fired part; unfortunately, the machining process commonly imparts defects to the fired part, thereby creating property limiting, especially strength limiting, defects.

An alternate approach to thermoplastic resin molding has been to substitute low temperature melting, low viscosity waxes in place of the thermoplastic resins also for low pressure injection molding; yet problems remain, such as those associated with dispersion, binder removal, machining, green strength, and dimensional tolerance.

Historically, investigators have recognized the limitations that the binder has placed on the processing of complexly shaped, three-dimensional parts. The art later began to understand and appreciate that the binder, which had allowed the ceramic and metal particles to be formed into a shape and later handled, was also the cause of many economic and performance problems. Rivers, as described in U.S. Pat. No. 4,113,480, developed an aqueous-based injection molding process exclusively for metal powders using 1.5 to 3.5 wt. % (metal powder basis) of high viscosity methylcellulose additive to provide green strength. The resulting mixture of metal powder, water, and methylcellulose has a "plastic mass" consistency and can be injection molded at 8,000 psi. The molded mass is then thermally dried and the green part is conventionally sintered. Although binder burnout was eliminated by this particular process, defects still remain, as well as the costs associated with dispersion and molding of a high viscosity mix and the implementation of a necessary but difficult thermal drying step. At present, there are a number of similar processes being used based on, for example, METHOCEL brand methylcellulose (available from Dow Chem. Co., Midland, Mich.). Another analogous process is taught by U.S. Pat. No. 4,734,237, in which Fanelli et al. describe using a slip having an agaroid gelling agent for molding ceramics; the molding pressures are between 20 psi and 3500 psi, and the as-molded parts can be dried or placed directly in the furnace. Comparably, Maeda et al., in Japanese laid open application 61-158403, describe molding a mineral spirits-based slip in which the temperature is lowered to below the melting point of the dispersant. Presumably, this is also a gellation process because of the low amount of dispersant (less than 5 wt. % in the examples, comparable to the amount of agar Fanelli et al. teach), and a melting point for the dispersant significantly greater than that for mineral spirits (also known as naphtha, benzin; m.p. $-73°$ C.).

The use of a molding vehicle which could be frozen has been investigated as an alternate method for casting or molding without the use of thermoplastic carriers. Sublimative drying by freeze drying (lyophilization) has been shown to be less destructive to the particle fabric in the green part during drying. A. Kwiatkowski et al., "Preparation of Corundum and Steatite Ceramics by the Freeze Drying Method," *Ceramurqia International,* vol. 6, no. 2, pp. 79-82 (1980). A closer examination of this disclosure reveals that what is ostensibly "freeze-drying" allows not only for some evaporation but also for the formation of a continuous liquid phase of liquid at the vehicle-atmosphere interface. An indication of the formation of a continuous liquid phase during drying is found in the description by Kwiatkowski et al. of smoother and more densely packed surfaces on their articles. Such characteristics indicate the formation of a continuous liquid phase during drying, which allows for capillary forces between the inorganic particles, thereby pulling them together during drying to yield a denser, smoother surface.

A method has been described by Nesbit, in U.S. Pat. No. 2,765,512, which involves casting a ceramic shape from a thick slip containing a hydrogen bonding medium (such as water), a cryoprotectant, and ceramic particles which are then frozen into a shape while in the mold. The resulting frozen part was demolded, dried at room temperature and pressure, and subsequently fired. Downing et al., U.S. Pat. No. 3,885,005, has cast coarse grained refractory shapes from a slip containing 70% coarser than #200 mesh ceramic particles, water, and a silica sol binder. The resulting cast shape was subsequently frozen, causing the silica to gel and cementing the refractory particles together. The residual water was frozen and the part was demolded and heated to 200° F. to thaw and dry the part. Tomilov, G.M., and T.V. Smirnova, "Molding Quartz-Ceramic Articles Using an Aqueous-Slip Freezing Method," *Glass & Ceramics,* no. 10, pp. 655-6 (1977) also describe freeze molding a ceramic part that is later dried by the application of heat.

Dennery et al., U.S. Pat. No. 3,567,520, in making metal parts from powdered metals, formed an aqueous-based paste sheet into a part, which was then frozen at $-60°$ F., and subsequently freeze dried to overcome thermal drying stresses which would be destructive to the part. Maxwell et al., U.S. Pat. No. 2,893,102, cast and molded thicker parts from an aqueous ceramic slip in which the slip and mold were frozen in a $CO_2$ bath followed by freeze drying and sintering.

As a slight departure from the art thus described, Weaver et al., U.S. Pat. No. 4,341,725, describes the use of a cryoprotectant as an additive in a hydrogen-bonding suspension medium to inhibit ice crystal growth to the order of 0.020-0.050 mm (i.e., 20-50 $\mu$m); they teach that the defects induced by larger ice crystals can cause severe strength limiting defects. A paste-like slip at very high solids content (about 70 vol.%) is vibrated into a mold and frozen; the frozen part is dried in a vacuum oven. Weaver et al. claim that the foregoing prior art would result in "low performance" articles riddled with scars resulting from ice crystal formation.

What may be viewed as a combination of the gelation technology and the freezing technology is a disclosure by Blasch et al., in U.S. Pat. No. 4,552,800, in which freeze-sensitive colloidal sols are used as the solidification agent. Silica based sols are well-known to irreversibly gel upon such processes as heating and freezing. The gelled green articles, which may contain a substantial amount of silica, are typically vitreous sintered; for example, the composite alumina-zirconia articles made by Blasch et al. are underfired, they are fired below the conventional sintering temperature for either alumina or zirconia, but are heated so that the silica-based glass melts and causes densification of the body.

Takahashi, in European Patent Applications Nos. 160,855 and 161,494, describes a method for freeze-pressure molding inorganic powders. That method includes providing a flocculated feedstock, shaping the feedstock under high pressure (at least about 2800 psi (200 $kg_f/cm^2$)), consolidating the shaped feedstock (including removing a portion of the fluid medium), and freezing under pressure to form a frozen shape; the resulting shape is dried, such as by freeze drying, and then conventionally sintered. Besides the necessity for high pressure forming and consolidation, the Takahashi process has another disadvantage of being limited to particles having a size not greater than about 1 (one) micron. In general, a perusal of these two European patent applications shows that the process is designed to overcome or avoid volume expansion on freezing by the use of mechanical means. Still further, Takahashi achieves what is termed a "high density" article, which for alumina is disclosed to be about 85% of theoretical, far below the 98+% of theoretical density typical for high performance alumina applications. It is also noted that the Takahashi process is designed to consolidate the inorganic particles by forming a frozen shell at the mold surface; the consolidation apparently provides sufficient green strength that the part does not have to be frozen throughout, and may only be frozen near the mold surface.

One factor that effects whether a particular process possesses advantages or detriments over another process is the type and use of the article being made. Refractories, for example, are typically made from a very broad distribution of particle sizes (e.g., fines of colloidal size to a few hundred microns in size) and often include a not insignificant amount of silica. The resulting articles are usually not fully dense; the open, porous structure is desired because it provides increased resistance and immunity to thermal shocks.

Herrmann, in U.S. Pat. Nos. 3,330,892 and 3,234,308, (both incorporated herein by reference) describes a molding process using vehicles which are normally solid at room temperature, such as paradichlorobenzene, naphthalene, and camphor; the slip is heated to liquefy the vehicle and the mold is cooled to elicit solidification. The vehicles are dried by subliming at about 10° C. below the melting point of the vehicle. This disclosure is notably directed to refractories, particularly allowing the pressing of dense refractory bricks from finely divided particles (−325 Tyler mesh, about 44 μm). Assuming minimal volume change on drying (≦1%) and based on the linear shrinkages during sintering, the fired densities described in the examples range from 73% to 87% of theoretical density, and 96% of theoretical density for a borosilicate glass powder composition. In some contrast, the fired density of ceramics for structural applications (e.g., non-glass compositions such as engine components) is typically at least 98% of theoretical.

SUMMARY OF THE INVENTION

In general, we have provided a process for forming articles by: providing a well-dispersed slurry consisting essentially of at least about 30 vol. % inorganic sinterable particulates, a non-aqueous liquid vehicle having a volume 5 change on freezing of not greater than about ±10%, and a dispersant; providing a closed mold of a desired geometry; injecting the slurry into the closed mold at a pressure less than about 1000 psi; decreasing the temperature of filled mold to below the freezing point of the vehicle for a time sufficient to result in a solidified piece; drying the piece under controlled temperature and pressure conditions to sublime the frozen vehicle and produce a green piece; and sintering the green piece to produce a densified article.

In one embodiment, the slurry is injected into a mold which is already chilled to below the freezing point of the vehicle. In a preferred embodiment, the slurry includes at least about 35 v/o sinterable solids. Other embodiments include the use of a vehicle that is normally solid at ambient conditions as well as the use of concurrent sublimation and evaporation to dry the solidified piece.

A feature of this process is the ability to use both narrow size range and fine (e.g., submicron) particles, which allows for sintering at lower temperatures due to the density and uniformity of the green article. Further, the present process allows for the elimination of the conventional thermoplastic binder removal step and, because the green article can be formed to a high dimensional tolerance, reduces or eliminates the machining steps, both of which are traditional sources for defects which lead to non-uniformity of the final part; reduced machining provides the additional advantage of alleviating submicron airborne particulates. Still further, articles having larger cross-sections can be made using the present invention while also attaining a high surface detail replication and resolution. Another advantageous feature of the invention is the ability to form a green article having sufficient green strength for handling and demolding.

Other features of the present invention, especially relating to the use of a non-aqueous vehicle, include: facile mold release; less or no volume expansion upon freezing; the capability of higher (and a broader range of) molding, freezing, and drying temperatures; faster drying; and the ability to process materials incompatible with water. Although not all non-aqueous vehicles will exhibit all of these features, even singly these features are important and beneficial considerations for providing an economically feasible processing system.

Still other aspects and features of the invention are derived from the capacity to form the slurry under low pressures, less than 1000 psi and down to 100 psi or even less. Such features include lower equipment costs for tooling of the molds and the injection machines and reduced mold wear. In general, the capacity to inject at low pressure provides for an easier and a more timely, efficient process.

The present invention also provides a ceramic or metallic article having a uniform, homogeneous composition, a smooth texture-free surface finish, a dense or uniformly porous defect-free microstructure, and a high dimensional tolerance. In essence, this invention provides the ability to control defects on a particle size scale, in contrast to the 20-50 micron defects with which the art has typically been concerned. The invention is described below in more detail with respect to various specific embodiments.

DETAILED DESCRIPTION OF SPECIFIC EMBODIMENTS

The present invention is particularly directed to non-aqueous systems for forming complexly shaped ceramic and metallic parts from a low pressure injectable slurry. In general, the slurry is composed of sinterable inorganic particles, a non-aqueous vehicle, and a dispersant.

The sinterable particles can be ceramic, metallic, or a combination of the two. Exemplary ceramic compositions include, but are not limited to, the oxides, carbides, nitrides, silicides, borides, silicates, titanates, zirconates, and the like and mixtures thereof, of aluminum, barium, beryllium, boron, calcium, lanthanum, lead, silicon, tungsten, titanium, zirconium, and mixtures thereof; this also includes composite powders such as SYALON AA and SYALON 101 grades of powder for making SiAlON articles (both available from Vesuvius Zyalons, Mid Flamorgan, Wales, U.K.). Exemplary metallic compositions include, but are not limited to, aluminum, nickel, iron, titanium, copper, tungsten, molybdenum, beryllium, and mixtures and alloys thereof, such as steels (e.g., stainless, low alloy, copper, silicon, and the like), brasses, bronze, and so forth. The present process has also been useful in forming structures from high temperature superconducting ceramics, such as $YBa_2Cu_3O_{7-\delta}$; exemplary superconducting ceramics include $LM_2Cu_3O_{7-\delta}$, $(L_{1-\delta}M_\delta)_2CuO_4$, $MPb_{1-\delta}Bi_\delta O_3$, $LaCuO_4$, $Bi_2M_3Cu_2O_8$, $M_2YCu_3O_7$, $Tl_2M_4Cu_3O_{10}$, and mixtures thereof, wherein $0<\delta<1$, L is a lanthanide or mixtures thereof, and M is Ba, Sr, Ca, or mixtures thereof.

The starting powders preferably have a particle size range of from about 0.1 micron to about 150 microns (about 100 mesh), although we have molded both finer and coarser particles using the present invention. For high performance or technical ceramics, an average particle size of not more than 5 μm, preferably not more than 2 μm, and most preferably not more than 1 μm, is desired. The particle size distribution has a significant effect on both the slip viscosity and the green density. Essentially uniformly size particles (e.g., standard deviation not more than about 20% of the mean particle size) have a maximum green packing of about 72% (hexagonal close packed) and practically can only be provided in a low viscosity, pourable slip at less than about 50% by volume. E.g., Dabak and Yucel, "Shear viscosity behavior of highly concentrated suspensions at low and high shear-rates," *Rheolooica Acta*, 25:527-533 (1986); Phelps and McLaren, "Particle-Size Distribution and Slip Properties," *Ceramics Processing Before Firing*, Ed. by Onoda and Hench (New York: John Wiley & Sons, 1978), both incorporated herein by reference. Nevertheless, as discussed below, there are methods for making highly loaded (≧55 vol. % solids) slurries which are pourable.

The surface area of the particles can be from less than 1 m²/g to more than 100 m²/g (B.E.T.), with no more than about 25 m²/g preferred; powders having a high surface area are generally molded with slips having relatively low solids contents (potentially lower than 30% by volume).

For the sake of simplicity, the term "ceramics" will be used to illustrate the invention, and it is to be understood that that term connotes both ceramic and metallic particles as well as mixtures thereof; thus, the present invention also contemplates the production of composite structures. Of course, a densified article formed from a metal powder will be a metal, not a ceramic, and the sintering conditions for various metal and ceramic compositions, although readily determinable by one of ordinary skill from literature references or ordinary experimentation, will depend upon the particular composition. Nevertheless, the present invention generally is applicable to forming dense articles from inorganic powders.

The vehicle is non-aqueous and is preferably liquid at the desired batching and forming stages of the unit operations. Nevertheless, as explained more fully below, the vehicle may be a solid at ambient temperature and pressure, in which case a fluid slip is formed by heating the mixture of the vehicle, particulates, and dispersant. The vehicle should be compatible with the particulates, both chemically and to avoid flocculation; the vehicle should also be compatible with the dispersant. These are sufficient criteria for producing a low pressure injectable slip; however other criteria become factors in other aspects of this invention.

While this invention is illustrated primarily by the examples below, exemplary vehicles include, but are not limited to, propanal, methyl ethyl ketone, cyclohexanone, methanol, ethanol, propanol, glycerol, neopentyl alcohol, formic acid, formamide, pyridine, dioxane, methane (including clathrate), ethane, butane, isobutane, hexane, cyclohexane, acetonitrile, acetamide, and the like and compatible mixtures thereof, which are compatible with the powder, and which have a volume change on freezing of not more than about ±10% by volume.

When the vehicle undergoes a volume change on freezing, it can either expand or contract. For expansion, as with water, some cryoprotectant agent is necessary, although expansion on freezing for non-aqueous compounds is rare. If the expansion is too great, then there is generally insufficient particle-to-particle contact to support the article during drying, or the drying shrinkage is too great and cracking occurs during drying. On the other hand, if the vehicle shrinks during freezing, then the volume decreases (consolidation akin to that in the Takahashi process) and dimensional tolerance can be lost, or there may be voids in the frozen pore fluid which may not be eliminated during sintering. We have found that a volume change on freezing (essentially only shrinkage for organic vehicles) of ±10% is required to produce dense sintered articles; a higher volume change results in processing defects that cannot be eliminated during sintering, although for less dense articles, a higher volume change may be tolerated. This aspect is further discussed below in connection with the rate of freezing.

The present vehicles should be contrasted with those taught by Herrmann. Data for the volume change on freezing of chloroacetic acid, naphthalene, and benzoic acid is about 14% shrinkage (as published in *Data Compilation Tables of Properties of Pure Compounds*, pub. by Design Institute for Physical Property Data, Amer. Inst. of Chem. Eng. (AIChE) (New York, 1985); see also S.C. Khetarpal et al., "Thermodynamic Studies on Melting of Some α- and β-derivatives of Naphthalene," *Aust. J. Chem.*, vol. 32, p. 49–57 (1979), both incorporated herein by reference), and Herrmann discloses that paradichlorobenzene has an even higher shrinkage upon freezing. In contrast, the referenced data compilation tables indicate a volume shrinkage of about 6.5% for both phenol and ε-caprolactam, and other published values are 5.2% (5.2 cm³.mol⁻¹) for cyclohexane (Stokes and Tomlins, "Thermodynamic functions of melting for cyclohexane," *J. Chem. Thermodynamics*, vol. 6, p. 379–386 (1974)) and 9.9% for neopentyl alcohol (J.C. van Dam, "Phase diagram and physical properties of neopentyl alcohol: a model substance for solidification," *J. Mat. Sci. Lett.*, vol. 5, p. 812–814 (1986)) (both incorporated herein by reference).

The dispersant can be any one of a number of well-known dispersants, and is typically chosen empirically for a given system. There are a number of diverse dispersants we have found to work well, including, but not limited to, acrylic acid-based polymeric polyelectrolytes (e.g., EMCOL CC-55, a cationic polypropoxy quaternary ammonium acetate, available from Witco Chem. Co., Perth Amboy, N.Y.), oxidized triglycerides (e.g., fish oil, although quality control varies significantly), sorbitan esters (e.g., SPAN 85, a sorbitan trioleate, available from ICI Americas, Wilmington, Del.), phosphate ethers (e.g., GAFAC RE-610, an anoinic polyoxyethylene nonylphenyl ether phosphate, available from GAF, Wayne, N.J.), and diesters (e.g., AEROSOL TO, a dioctyl ester of sodium sulfosuccinic acid, available from American Cyanamid, Danbury, Conn.), and the like. Other dispersants include amine oxides, alkyl betaines, silicon-based compounds (e.g., gamma-aminopropylmethoxy silane), and similar compounds which are inert with respect to the ceramic and/or metallic composition. The dispersant is present in an amount effective to provide a well-dispersed system. Generally, this results in about 0.5 to about 5.0 wt. % dispersant (powder basis) in the slurry, more preferably in the approximate range of 1.5 to 2.7 wt. %.

The slurry may also optionally include an internal demolding lubricant. Such mold release agents include compounds such as oleic acid, stearic acid, waxes such as polyethylene glycol, and the like and mixtures thereof. Such compounds are conventional in the art, and if used herein, should be compatible with the other slurry components. If used, the mold release agent is preferably present in amounts of from about 1 to about 3 vol. %.

The slurry may also include a conventional sintering aid, such as yttria, magnesia, ceria, and the like, depending upon the specific particulate composition or mixture. For example, 2 to 3 wt. % of Y₂O₃ for AlN powder, or 0.4 wt. % magnesia for alumina powder, based on the powder weight, may be present.

In general, the three components are mixed under high shear rate to disperse the particles to the primary particle size and to provide an injectable slip; the particles are well-dispersed when they are present in the slurry as primary particles (as opposed to particle agglomerates and flocs). The particulate materials are present in the slip in an amount of at least about 10 vol.

%, preferably at least about 35–50 vol. %. Mixing under high shear rate can be accomplished by the use of a dispersing device, preferably a conventional milling apparatus such as a Sweco mill (available from Sweco, Inc., Los Angeles, Calif.). The slip viscosity is expected to be no more than about 2000–3000 cP at 100 s$^{-1}$, preferably less than about 1000 cP, and most preferably (such as described in some of the following examples) down to less than 100 cP. Nevertheless, it is sufficient if the slurry is injectable at pressures less than about 1000 psi, preferably less than 500 psi, and most preferably less than about 100 psi.

The slip has a low, pourable viscosity, by which is meant it will flow in a constant stream under gravity heat. In contrast, although dry powder and paste-like compositions may be poured, such compositions are either not liquid or the mold must be vibrated to provide complete filling (as is conventional in slip casting paste-like slips); thus, for a paste-like composition, the material is not sufficiently fluid that it can completely fill the mold volume under its own weight, but rather requires vibrational energy for the slip to pack itself into the mold. The present slips can be injected using a typical hand-held plastic syringe. Other methods for producing highly loaded pourable slurries for ceramic and metallic articles are described in U.S. Pat. No. 4,816,182, and U.S. Pat. No. 4,882,304, U.S. Pat. No. 4,904,411, and in co-pending application Ser. No. 354,036, filed 16 May 1989, the disclosures of which are incorporated herein by reference. Methods for obtaining desired particle size classifications, especially for submicron fractions, are described in U.S. Pat. No. 4,781,671 and U.S. Pat. No. 4,882,088, and co-pending application Ser. No. 338,492, filed 13 April 1989, all incorporated herein by reference.

The slip may also include a viscosity modifier. The slips suitable for use in this process may be dilatant, but are nevertheless pourable. A viscosity modifier is desireable, for example, to change the rheology from generally pseudoplastic to more Newtonian. The viscosity modifier is generally present in smaller amounts for longer, higher molecular weight compounds and larger amounts for shorter molecules. An exemplary viscosity modifier for non-aqueous systems is an acrylic resin such as those available under the ELVACITE designation from E.I. duPont de Nemours & Co., Wilmington, Del.; such resins are typically present in amount of 0.01–5.0 wt. %, more preferably 0.05–3 wt. %. It is also important to note that the viscosity modifier, as well as the dispersant, because they are long chain molecules, also act as binders or green strength enhancers for the dried article; in other words, the same molecules which "lubricate" the slip and allow the particulates to move past each other also act to bind the particulates in the green state (i.e., analogous to a conventional thermoplastic binder but present in a significantly smaller quantity).

The injectable slip is then made into a desired shape. More particularly, this operation includes the steps of providing a quantity of the slip in a desired geometry and of fixing that geometry; the former operation will be termed forming and the latter will be termed solidifying. However, it should be noted that these operations are not necessarily discrete and that one may accompany the other in whole or in part.

In view of the low, injectable viscosity of the slip, it can be formed under low or zero (gauge) pressure into a desired geometry; it can be poured into and will fill a mold as would a conventional liquid, and without resort to vibration as used for powders and paste-like slips. For example, the slip can be cast, such as by tape casting against a cold plate, or it can be injection molded. Conventional thermoplastic injection molding technology considers "low pressures" to be in the vicinity of about 5000 psi. For ceramics, a low pressure (about 100 psi) process is described by Anders F. Henriksen (in "Manufacturing Intricately Shaped Oxide Ceramics Using Low Pressure Injection Technique," *Advanced Ceramics '87 Conference Papers* as sponsored by Soc. of Mfg. Eng., no. EM87-104 (1987)). That process includes providing a slip composed of ceramic particulates, a surfactant, and a molten wax, and keeping the slip agitated to render it in a state of a high viscosity fluid, qualitatively described as having a viscosity somewhere between that of a thick latex paint and that of taffy; the wax is removed from the solidified piece by an undisclosed, proprietary process.

For the purposes of the present invention, low pressures include those from about 1000 psi down to about atmospheric, the latter being essentially zero pressure forming. The ability to form under low pressure, as discussed above, provides economic advantages by alleviating the requirement for more expensive, high pressure equipment, and the more expensive tooling required for such apparatus. In addition, an injectable slip facilitates mold filling and thus is beneficial to producing as-molded complex shapes.

After the slurry is formed (i.e., a desired quantity of slurry is shaped into a desired geometry), the formed slurry is fixed into that geometry by solidifying the non-aqueous vehicle. The solidified part is frozen throughout (as opposed to a freezing-consolidation process as described by Takahashi). There are various embodiments of solidification, including chilling a mold into which the slip was previously injected, and injecting the slip into a chilled mold, the latter being a preferred embodiment. As used herein, the term chilling means providing a temperature below the freezing point of the vehicle. In an embodiment where the vehicle is solid at ambient conditions (or any other desired reference conditions), such as neopentyl alcohol, the vehicle, and hence the slurry, can be made liquid by applying heat. Then, for example, the "molten" slurry can be injected into a heated, closed mold and solidification can be accomplished by removing the heat source, i.e., chilling the mold; alternatively, the molten slurry can be injected into a mold attached to a chilling system. In any embodiment, the result of the solidification subprocess is a solidified piece; as distinguished from a green piece, the solidified piece still includes the vehicle, although as a solid phase.

It is preferred to have the solidification rate as fast as is reasonably possible, because this beneficially increases the overall process rate and, although not desirous of being constrained to a particular theory, appears to reduce defects induced by solidification. We have found that a slow freezing rate is likely to result in dendritic growth of the crystallites, which is detrimental because the dendrite size can be larger than the pore size, and thus dendritic growth disturbs the microstructure; also, dendritic growth can degrade surface finish and can result in a plane of weakness that cannot be removed by sintering. Additionally, since most organic vehicles shrink upon freezing, rapid freezing results in a part having a geometry very near the mold geometry (changes with respect to the mold volume are on the order of 0.5–0.7% by volume for cyclohexane slips at 40% by volume solids loading), which faciliates net shape forming with minimal machining. Rapid freezing can be effected by a large temperature difference between the mold and the slip; for example, a cyclohexane slip at room temperature, about 25° C., will freeze at 6.5° C., but is injected into a mold chilled to about −75° C. For thick parts (generally having a thickness of more than about 0.25 inch) a larger temperature difference between the slip temperature and the freezing/mold temperature is desireable. Thinner parts, because their geometry allows them to freeze more rapidly (such as in making a plate), can tolerate a smaller temperature difference; for example, a 0.375" plate can be injected into a mold held at −20° C. without freezing defects. We have also observed that different compositions exhibit different degrees of plasticity or deformity at different frozen temperatures, with lower temperature parts being more rigid and easily handled. We have also found it desireable to maintain the injection pressure on the sprue during freezing, which compensates for volume shrinkage in the mold; this technique is conventionally practiced for (non-ceramic) thermoplastic injection molding (e.g., I.I. Rubin, *Injection Molding Theory and Practice* (New York: John Wiley & Sons, 1972), p. 270–286).

The solidified piece may not be fully "frozen"; that is, there may be micropockets of vehicle present as liquid. While not desirous of being constrained to a particular theory, it is believed that the injectable and injected slurry may be well-dispersed on the macro and mini scales, but on the micro scale (e.g., on the particle diameter scale) there may be localized surface chemistry, and thus in the continuous phase there may be different localized surface chemistry that allows for the formation of micropockets of liquid; this phenomenon would be more likely to occur in a system that includes cryoprotectants. What is important is that these micropockets are well-dispersed in the solidified piece. Additionally, although not desirous of being constrained to a particular theory, it is believed that the freezing rate has an effect on the distribution of these micropockets as well as on the microstructure of the solidified and the resulting green piece, with more rapid freezing rates providing more dispersed micropockets. However, this supposition must also be considered with our observations that an acceptable freezing rate is a function of the volume fraction of solids, and that a higher solids loading can tolerate a slower freezing rate without the occurrence of defects in the green piece, although liquid micropockets may still be created. Any micropockets of liquid may also effect the drying, as discussed later.

The solidified piece has an essentially uniform composition (including both the amounts of particulates, vehicle, and dispersant, as well as the various phases of the vehicle if a second, liquid phase exists to any appreciable degree) and can be easily handled. Another aspect of the invention is that these two subprocesses (forming and solidification) can be performed in a closed mold (i.e., essentially a closed volume except for vents to allow for the escape of air during molding). Even though there may be some volume change on freezing, which may even be as great as about ±10 vol. %, the solidified piece can be dried and sintered, which is indeed surprising given what those such as Weaver et al. suggest.

The solidified piece is then demolded and dried. The drying subprocess is essentially the non-destructive sublimation of the vehicle. However, as noted previously, the vehicle, although essentially frozen throughout, may not be fully solidified on a microscopic scale. Accordingly, some evaporation of the vehicle may accompany the sublimative drying. In addition, if a two- or multi-component vehicle is used, depending upon the drying conditions, certain components may preferentially melt and evaporate rather then sublime. The importance of any liquid present during the sublimative drying is that it occur randomly in micropockets rather than in a continuous liquid phase; formation of a continuous liquid phase (thawing or melting) allows for capilary forces to act on the frozen microstructure. The resulting capillary forces have a number of detrimental effects: they can cause and/or exaggerate drying stresses to the extent that cracking is more likely; they are likely to cause particle rearrangement, thereby destroying the homogeneous dispersion of the original slip that was frozen in place, which rearrangement is likely to result in defects; the forces can cause sufficient particle rearrangement (e.g., as in Kwiatkowski et al.) to cause density difference across the green piece, which differences cannot be eliminated during sintering; the liquid phase may result in slumping and other mechanisms for particle rearrangement; and so forth. Generally, the vehicle is at least 98% frozen, and is more preferably 99+% solidified.

Drying is accomplished in an environment having a reduced pressure and preferably having, within the environment, a condenser at a temperature below the freezing point of the vehicle. The rate of freeze drying is effected by the geometry and thickness of the piece (e.g., a tape will dry faster than a sphere at for the same system), the condenser temperature (the lower the temperature of the condenser below the temperature of the frozen vehicle, the faster the rate), the part temperature (the closer the temperature of the part to the melting point of the vehicle, the more rapid the rate), the heat of sublimation of the vehicle (including the heat of melting and/or the heat of evaporation if there is concurrent evaporation; a small the heat of sublimation leads to more rapid drying), the vapor pressure of the vehicle at the temperature of the solidified piece, the average pore size of the piece (affected by the average particle size and distribution of the starting powder, affecting tortuosity and mass transport of vehicle through to the surface of the piece), and other similar factors.

In accordance with the foregoing discussions, there may be some systems where it would be advantageous to perform the processing at elevated temperatures and pressures and then perform the sublimative drying subprocess at ambient temperature and pressure. The present drying subprocess does not include what is conventionally termed "freeze drying" because, upon closer inspection, that terminology encompasses processes that include a significant amount of evaporation, usually sufficient to allow for a continuous or nearly continuous liquid phase. (Thus, the formation of a continuous liquid phase can be created by insufficient solidification or by improper drying.) More specifically, as used herein, "freeze drying" means drying at both a pressure below the vapor pressure of the vehicle and a temperature below the melting point of the vehicle. (For example, Weaver et al. teaches drying a frozen water-based part in a vacuum oven, where the temperature is clearly above the melting point of the vehicle.) Additionally, because the forming can be accomplished in a closed mold, the drying subprocess can be accomplished with the solidified piece still in the mold.

Drying by sublimation is an endothermic process. Accordingly, in some instances it may be desireable to heat the drying part, such as by using infrared lamps or some conductive heat transfer means. However, according to this invention, the part temperature must remain below the melting temperature of the vehicle. Thus, for example, for a part formed with cyclohexane and which was molded at about $-75°$ C., the drying part may be heated so that its temperature is kept at about $-20°$ to $-30°$ C.

Heating the drying part to facilitate drying must be balanced against the need to control drying to avoid defects. In addition to capillary forces caused by the presence of a continuous (i.e., not necessarily over the entire surface, but over a macroscopically significant portion of the surface), too rapid a rate of sublimation can cause similar defects. Depending on the part geometry, average particle size and distribution (tortuosity), and green density, among other factors, fine grained, technical ceramics should be dried more slowly, whereas porous, refractory-like ceramics may be dried more quickly because the open, less-ordered microstructure can tolerate artifacts introduced by the increased evolution of frozen vehicle during rapid drying (e.g., bubbles and delamination-like defects).

The foregoing, then, generally describes our invention. We have discovered that this invention is capable of producing high performance ceramic and metallic parts; a high performance part, as mentioned above, should exhibit characteristics approaching those intrinsic to the material. The present invention can produce articles having a density of $>99\%$ theoretical and with no pores of a size greater than about 20 $\mu$m, thereby providing a high performance article having high strength. High dimensional tolerance is another high performance property, and the present invention can provide articles having a dimensional tolerance of $<\pm 0.5\%$ and an as-molded, as-dried surface roughness of $<80$ micro-inches (about 2.03 micrometers). Yet another high performance property is thermal shock resistance, which is improved by compositional uniformity, and is achievable with the present invention by starting with a well-dispersed slurry and the proper processing thereof.

In any embodiment, the resulting dried, green piece can be conventionally sintered. Such techniques, including sintering times, temperatures, and atmospheres, are well-known or easily determinable by a ceramist or metallurgist (for metal powders) of ordinary skill in the art, and routine experimentation is ordinary for determining optimum times, temperatures, and rates for a fully dense article.

We have also found that the frozen article is sufficiently plastic that it can be further formed into a different geometry. For example, a tape (of about $4''w \times 12''l \times 0.5''$ thick) based on a cyclohexane slip has been formed into a tube and sealed by using excess slip as a potter would use clay to seal a seam. The part was then dried and sintered to a dense, integral article; the seam, from visual inspection, was dense and crack free, and did not appear to be a structural limitation. Accordingly, this invention is usefully adapted to a number of different geometries and forming processes.

The invention is further illustrated by the following examples.

EXAMPLE I

This example describes the production of a four-vane rotor about 2.0" in dia. and about 2.0" high. The rotor geometry includes a hollow conical hub to which four helically shaped vanes are attached, having a 90° angle between their leading and tailing edges' the vanes have a cross sectional thickness of about 0.25" tapering to about 0.125" at their outer edges.

Aluminum nitride powder (designated Grade C, available from Hermann C. Starck, Niederlassung Laufenberg, Berlin, Germany; impurities include N 29.9%, C 0.1%, O 1.6%, and Fe 0.05%) was used as received; the powder had a particle size range of about 2-4 microns and a B.E.T. surface area of about 4-8 $m^2/g$. This powder, plus 2 wt. % (powder basis) of a dispersant (EMCOL CC-55, described above) and 2 wt. % of a sintering aid (yttria, described above), were mixed with cyclohexane overnight on a roller mill (end-over-end) to provide a slurry having a solids content of about 50 vol. % and a viscosity of about 650 cP at 100 $s^{-1}$. After batching and milling, the pourable suspension was de-aired and injected at about 20 psi into a closed, fixed volume steel mold that was previously chilled to $-78°$ C. Within a few minutes the part was solidified and was easily de-molded and handled. The solidified part was dried in a freeze dryer having a condenser temperature of less than $-40°$ C. and in a drying environment at about 100 millitorr to produce a green part, which was subsequently sintered at about 1800° C. for about 2 hours under a nitrogen gas atmosphere. The sintered part had a uniform grain size and a density of $>99\%$ theoretical (3.24 $g/cm^3$), and exhibited about 24.6% x-y shrinkage and about 24.4% z shrinkage during sintering.

Comparative Example

This example is comparative with respect to the "freeze drying" subprocess. As noted above, the present slips are pourable, they will fill a mold and flow under their own weight, in contrast to pastes which may exhibit some pourable characteristics but are more solid-like in behavior. If, for example, the present slip is poured onto a table surface it will flow off the edges as would a typical liquid, whereas a paste-like slip may spread out but can be built up to some appreciable height. (For an example of a paste-like slip, see U.S. Pat. No. 4,677,082, for an invention of Alford et al., and the description of their slip rheology.) Accordingly, if a continuous liquid phase were to form during drying, the slip would return to liquid like behavior; this is manifest by melting, slumping, or similar distortion or non-uniformities in the part.

A slip was prepared in accordance with the above-referenced application Ser. No. 125,643 and was composed of 59 vol. % alumina (A16SG brand, available from Alcoa, Pittsburgh, Pa.), 15 vol. % methanol (cryoprotectant), 2 wt. % dispersant (NARLEX LD-45 brand, available from National Starch & Chem. Co., Bridgewater, N.J.; about 4 vol. %), the remainder water. The slip was molded into a chilled mold essentially following the procedure described in Example I for forming, solidifying, and demolding.

Instead of drying the part at reduced pressure and below the freezing point of the vehicle (in accordance with this invention), drying was attempted in a vacuum desiccator at room temperature. In essence, this method of drying is identical to the vacuum furnace used as described in the patent to Weaver et al. The part melted, presumably because of the use of a fluid slip and allowing the part to melt or thaw during drying, to form a continuous liquid phase during drying.

This same general experiment was repeated a number of times. We have found that if thawing is allowed to occur then drying cracks are likely to occur. Further, even those parts which appeared to dry crack-free when dried above the melting point were found to crack upon sintering (even with a conservative sintering schedule); examination of the parts revealed symptoms of stress-induced defects indicative of the formation of a continuous liquid phase.

EXAMPLE II

The procedure of Example I was repeated, using about 60 vol. % neopentyl alcohol $((CH_3)_3CCH_2OH)$ as the vehicle (a solid at room temperature; $T_{m.p.} = 52°$ C.), about 40 vol. % alumina powder (having an average particle size of about 0.3 to about 0.5 micrometers and having a standard deviation of less than about 50% of the mean particle size (available under the designation CPS-X from the present assignee, Ceramics Process Systems Corp. Cambridge, Mass.), and about 2 wt. % dispersant (EMCOL CC-55, as described above). The system was formed at room temperature and was dried, under vacuum, at room temperature. The green part remained intact and was sintered to 98% of theoretical density.

EXAMPLE III

The procedure of Example I was repeated using about 45 vol. % of stainless steel powder (designated Special Steel Powder 316, available from Pacific Metals Co. Ltd., Tokyo, Japan), about 2 wt. % dispersant (EMCOL CC-55, as described above), and about 55 vol. % cyclohexane as the vehicle. The green part was intact and was sintered to >95% of theoretical density.

It is desireable to minimize the amount of volume change of the vehicle on freezing. However, for isotropic freezing, a vehicle that undergoes expansion requires significant clamping forces on the mold (e.g., Takahashi), and a vehicle that undergoes shrinkage either pulls away from the mold or maintains the mold geometry but has internal porosity.

We have found that the volume change on freezing can be significantly decreased by using as the slip or slurry an emulsion of a vehicle that expands with one that shrinks during freezing. In generally, an aqueous/non-aqueous emulsion is preferred; also while preferable to use vehicles having as small a volume change on freezing as practical (e.g., not more than 10% by volume, preferably less), an emulsion using even high volume change vehicles (such as naphthalene or paradichlorobenzene) may be useful. Various aspects of the emulsion are likely to be important in reducing or eliminating volume shrinkage on freezing, namely the degree of emulsification, the degree to which one phase is well-dispersed in the other (the more homogeneous the emulsion, the more uniform the composite volume change on freezing throughout the part).

One consideration for using emulsions is that both the powder dispersion and the degree of emulsification require significant agitation. Unfortunately, this may be likely to entrain air which may not be fully removed during deairing. Another consideration is compatibility among the various components: for example, some inorganic powders may not be processable in water (or a non-aqueous vehicle that expands on freezing), or the dispersants or other components used in each of the vehicles may react (e.g., gel) when the phases mix. In general, to take advantage of using multiple vehicles, it is preferable to make separate slips, each including powder, vehicle, and dispersant (and optionally other additives), and not to add materials after the component slips of the emulsion have been mixed. Also, the solids loading is likely to be too low if powder is dispersed into only one phase. Of course, as implied, a number of different vehicles having different volume changes on freezing may be used; however, from a practical viewpoint, a binary system is the most desireable because of its relativel simplicity.

To fabricate the emulsion slip it is preferred to make separate slips, each containing powder, vehicle, and dispersant. One experiment involved formulating a cyclohexane slip (as in the above examples) and then adding water, which did not yield acceptable results: originally the system was very viscous, but additional mixing provided a more fluid slip (i.e., pseudo-plastic rheology); but while the slip was injected at 10 psi into a mold, the resulting parts showed evidence of a rather inhomogeneous emulsion.

Another experiment included making separate slips using SYALON AA brand SiAlON powder, one with water and NARLEX LD-45 (dispersant), and the other in cyclohexane with EMCOL CC-55 and GAFAC RE-610; these were mixed to provide an adequate emulsion. Thereafter, an ELVACITE brand resin was added (about 0.5 wt. % based on total slip) and the mixture was milled overnight. The result was a sludge-like, paste-like, plastic-like slip, which was believed to be caused by the present of the added resin.

EXAMPLE IV

A non-aqueous slip was made in accordance with the above-described techniques based on:

|  | vol. % | wt. % |
| --- | --- | --- |
| cyclohexane | 44.8 | 18.5 |
| acrylic resin (ELVACITE) | 0.9 | 0.5 |
| dispersant (RE-610) | 3.8 | 2.5 |
| dispersant (CC-55) | 6.9 | 3.7 |
| powder (SYALON AA) | 43.6 | 74.8 |

An aqueous slip was also made as based on:

|  | vol. % | wt. % |
| --- | --- | --- |
| water | 67.4 | 39.8 |
| dispersant (LD-45) | 1.4 | 1.0 |
| powder (SYALON AA) | 31.2 | 59.2 |

After both slips were mixed and the powders were well-dispersed, portions of the aqueous slip were added to the non-aqueous slip to achieve a slip having a final solids loading of 40% by volume. This was done by adding the aqueous slip in a staged order of addition (i.e., in aliquots); here, about 292.5 g. was added in 30 g. aliquots while mixing, with about one minute between aliquots to achieve a total of about 650 ml.; this technique is further described in the above-reference application Ser. No. 036,377.

The resulting emulsion slip was relatively stable: no separation was observable for at least about 30 min., and there was essentially no cyclohexane odor as compared with a slip based solely on cyclohexane.

The slip was molded (injected, frozen, demolded) as described in the previous examples; the as-molded parts appeared to have significantly less volume change than those based on cyclohexane alone. The parts were then dried, and fired as described in commercial literature. The sintered parts were crack free and had fired densities of at least 96% of theoretical.

The foregoing descriptions and discussions are meant to illustrate the invention and are not meant to be limiting in any manner. Various modifications, changes, and additions may become apparent to the skilled artisan upon reading this disclosure, and such are intended to be within the scope and spirit of the invention as defined by the claims.

What is claimed is:

1. A process for forming an article comprising:
    (a) providing a well-dispersed pourable slurry consisting essentially of at least about 35% by volume of inorganic sinterable particles, a non-aqueous vehicle having a volume change on freezing of not more than 10% by volume, and a dispersant selected from the group consisting of acrylic acid based polymeric polyelectrolytes, phosphate ethers, and combinations thereof;
    (b) providing a closed mold of a desired geometry;
    (c) injecting the slurry into the closed mold at a pressure of less than about 100 psi;
    (d) decreasing the temperature of the mold to below the freezing point of the vehicle for a time sufficient to freeze the vehicle and to result in a solidified piece;
    (e) drying the solidified piece by sublimation under conditions below the vapor pressure of the vehicle and below the melting point of the vehicle and without the formation of a continuous liquid phase effective to produce a green piece; and
    (f) sintering the green piece to produce a densified article.

2. The process as defined by claim 1, wherein the particulates are selected from the group consisting of the oxides, carbides, nitrides, silicides, borides, silicates, titanates, zirconates, and mixtures thereof, of aluminum, barium, beryllium, boron, calcium, lanthanum, lead, silicon, tungsten, titanium, zirconium, and mixtures thereof.

3. The process as defined by claim 1, wherein the particulates are selected from the group consisting of aluminum, nickel, iron, titanium, copper, tungsten, molybdenum, beryllium, and mixtures and alloys thereof.

4. The process as defined by claim 1, wherein the non-aqueous vehicle is selected from the group consisting of propanol, methyl ethyl ketone, cyclohexanone, methanol, ethanol, propanol, glycerol, neopentyl alcohol, formic acid, formamide, pyridine, dioxane, methane, ethane, butane, isobutane, hexane, cyclohexane, acetonitrile, acetamide, and mixtures thereof.

5. The process as defined by claim 1, wherein d. is performed prior to c.

6. The process as defined by claim 5, wherein the mold temperature is at least 25° C. below the freezing temperature of the vehicle.

7. The process as defined by claim 6, wherein the mold temperature is at least 50° C. below the freezing temperature of the vehicle.

8. The process as defined by claim 1, wherein the slurry further includes an internal demolding lubricant.

9. The process as defined by claim 8, wherein the lubricant is selected from the group consisting of oleic acid, stearic acid, polyethylene glycol, and mixtures thereof.

10. The process as defined by claim 1, wherein the dispersant is present in an amount of from about 0.5 wt. % to about 5.0 wt. % of the slurry.

11. The process as defined by claim 1, wherein the slurry further includes a sintering aid.

12. The process as defined by claim 1, wherein the slurry viscosity is not more than about 1000 cP at 100 $s^{-1}$.

13. The process as defined by claim 12, wherein the slurry viscosity is not more than about 100 cP at 100 $s^{-1}$.

14. The process as defined by claim 1, further including sintering to a density of at least about 95% of theoretical.

15. The process as defined by claim 14, further including sintering to a density of at least about 99% of theoretical.

16. A process for forming an article comprising:
    (a) providing a well-dispersed pourable slurry consisting essentially of at least about 35% by volume of inorganic sinterable particles, a non-aqueous vehicle having a volume change on freezing of not more than 10% by volume, and a dispersant selected from the group consisting of arcylic acid based polymeric polyelectrolytes, phosphate ethers, and combinations thereof;
    (b) providing a well-dispersed pourable slurry consisting essentially of at least about 10% by volume of inorganic sinterable particles, water, and a dispersant;
    (c) mixing the slurry of step (a) and the slurry of step (b) effective to form an emulsion slurry;
    (d) providing a closed mold of a desired geometry;
    (e) injecting the emulsion slurry into the closed mold at a pressure of less than about 100 psi;
    (f) decreasing the temperature of the mold to below the freezing point of the vehicle for a time sufficient to freeze the vehicle and to result in a solidified piece;
    (g) drying the solidified piece by sublimation under conditions below the vapor pressure of the vehicle and below the melting point of the vehicle and without the formation of a continuous liquid phase effective to produce a green piece; and
    (h) sintering the green piece to produce a densified article.

* * * * *